United States Patent
Suzuki et al.

(10) Patent No.: US 6,171,725 B1
(45) Date of Patent: Jan. 9, 2001

(54) NEGATIVE ELECTRODE MATERIAL FOR NON-AQUEOUS SECONDARY BATTERY

(75) Inventors: Atsushi Suzuki; Nobuyuki Isshiki; Kuniyuki Nakanishi, all of Wakayama (JP)

(73) Assignee: Kao Corporation, Tokyo (JP)

( * ) Notice: Under 35 U.S.C. 154(b), the term of this patent shall be extended for 0 days.

(21) Appl. No.: 09/117,137

(22) PCT Filed: Nov. 26, 1997

(86) PCT No.: PCT/JP97/04317

§ 371 Date: Jul. 24, 1998

§ 102(e) Date: Jul. 24, 1998

(87) PCT Pub. No.: WO98/24135

PCT Pub. Date: Jun. 4, 1998

(30) Foreign Application Priority Data

Nov. 26, 1996 (JP) .................................................. 8-314792

(51) Int. Cl.[7] ....................................................... H01M 4/24
(52) U.S. Cl. ....................................... 429/218.1; 429/231.8
(58) Field of Search .............................. 429/231.4, 231.7, 429/231.8, 231.95, 218.1

(56) References Cited

U.S. PATENT DOCUMENTS

| | | | |
|---|---|---|---|
| 5,587,256 | * | 12/1996 | Wilson et al. ........................ 429/218 |
| 5,624,606 | * | 4/1997 | Wilson et al. ........................ 252/506 |
| 5,656,394 | * | 8/1997 | Koksbang et al. ................... 429/218 |
| 5,698,340 | * | 12/1997 | Xue et al. ............................. 429/218 |
| 5,753,387 | * | 5/1998 | Takami et al. ........................ 429/194 |
| 5,780,181 | * | 7/1998 | Idota et al. ........................... 429/194 |

FOREIGN PATENT DOCUMENTS

| | | |
|---|---|---|
| 62-23433 | 1/1987 | (JP) . |
| 62-122066 | 6/1987 | (JP) . |
| 266856 | 3/1990 | (JP) . |
| 4126374 | 4/1992 | (JP) . |
| 5144474 | 6/1993 | (JP) . |
| 6310144 | 11/1994 | (JP) . |
| 729602 | 1/1995 | (JP) . |
| 7315822 | 12/1995 | (JP) . |
| 8213012 | 8/1996 | (JP) . |
| 8231273 | 9/1996 | (JP) . |
| 8236104 | 9/1996 | (JP) . |

* cited by examiner

Primary Examiner—Maria Nuzzolillo
Assistant Examiner—M. Wills
(74) Attorney, Agent, or Firm—Birch, Stewart, Kolasch & Birch, LLP

(57) ABSTRACT

The present invention relates to a negative electrode material having a great discharge capacity. A non-aqueous secondary battery essentially comprises positive and negative electrodes, the negative electrode material including a negative electrode material containing 30 to 90% by weight of silicon and 10 to 70% by weight of carbon for the non-aqueous secondary battery, wherein the negative electrode material is obtained by heating silicon or a compound thereof at 600 to 1,500° C. under a non-oxidative atmosphere in the coexsitence with an organic material carbon material.

10 Claims, No Drawings

NEGATIVE ELECTRODE MATERIAL FOR NON-AQUEOUS SECONDARY BATTERY

This application claims the benefit under 35 U.S.C. §371 of prior PCT International Application No. PCT/JP97/04317 which has an International filing date of Nov. 26, 1997 which designated the United States of America, the entire contents of which are hereby incorporated by reference.

BACKGROUND OF THE INVENTION

1. Technical Field

The present invention relates to a non-aqueous secondary battery, and particularly, a negative electrode material for the non-aqueous secondary battery.

2. Prior Art

In recent years, the miniaturization and lightening of portable devices have been remarkable, and with this tendency, the miniaturization and lightening of the batteries which can be used as power sources of the portable devices have been required very strongly. In consequence, various non-aqueous secondary batteries such as the so-called lithium battery have been suggested.

In the lithium battery, it is desirable to use metal lithium as a negative electrode. However, particularly in the case that the lithium battery is used as the secondary battery, an irreversible change of lithium such as the production of dendrite-like lithium occurs by the repetition of charge and discharge, so that problems such as capacity loss and safety decrease take place. Thus, satisfactory results have not been obtained so far.

Hence, one usual strategy for solving these problems is to use a carbon material as the negative electrode. As the carbon materials, graphite (JP-A-62-23433), pitch cokes (e.g., JP-A-62-122066 and JP-A-2-66856) and the like have been suggested.

In the carbon materials, however, it is difficult to exceed a theoretical capacity of graphite (372 mAh/g), and hence various amorphous carbons have been suggested. In the cases of these amorphous carbons, a high capacity can be obtained only in a cycle of charging and discharging at a low current, (e.g., approximately 0.1 mA/cm$^2$), but under actual use conditions, a low capacity (<270 mAh/g) can merely be obtained. The further improvement of the performance have been desired.

DISCLOSURE OF THE INVENTION

In view of the above-described problems, an object of the present invention is to provide a negative electrode material having a great discharge capacity.

The present inventors have discovered, by having made intense studies to solve the above-mentioned problems, that a negative electrode material obtained by heating silicon or a compound thereof at 600 to 1,500° C. under a non-oxidative atmosphere in the coexsistence with an organic material or a carbon material, is capable of solving the above-mentioned problems, and thus the present invention has been completed.

Namely, the invention is directed to a negative electrode material for a non-aqueous secondary battery, which has a silicon content in the range of 30 to 90% by weight and a carbon content in the range of 10 to 70% by weight and is obtainable by heating silicon or a compound thereof at 600 to 1,500° C. under a non-oxidative atmosphere in the coexsistence with an organic material or a carbon material.

In other words, the present invention provides a negative electrode material for a non-aqueous secondary battery, which has a silicon content in the range of 30 to 90% by weight and a carbon content in the range of 10 to 70% by weight and is obtainable by heating silicon or a compound thereof at 600 to 1,500° C. under a non-oxidative atmosphere in the coexsistence with an organic material or a carbon material.

A preferred silicon compound is selected from a silicon oxide, a silicone resin and a silicon-containing polymer. Silicon in the form of simple substance is more preferable.

A preferred organic material is a material which can be carbonized by a heat treatment.

The present invention further provides a method for preparing a negative electrode material for a non-aqueous secondary battery, having a silicon content in the range of 30 to 90% by weight and a carbon content in the range of 10 to 70% by weight, which comprises the step of heating silicon or a compound thereof at 600 to 1,500° C. under a non-oxidative atmosphere in the coexsistence with an organic material or a carbon material.

The present invention also relates to a non-aqueous secondary battery using the above-described negative electrode material for the non-aqueous secondary battery. It specifically comprises a positive electrode and a negative electrode, which can dope and undope lithium, and a non-aqueous electrolyte, said negative electrode including the negative electrode material. In general, a negative electrode includes a negative electrode material and a binder.

According to the present invention, silicon is used as the negative electrode and carbon is used as a conductive material and for this reason a high discharge capacity can be obtained.

Conventionally, use of silicon has been avoided because it reacts with lithium to lower the capacity, as described in JP-A-4-126374 and JP-A-6-310144.

JP-A-7-29602 (corresponding to U.S. Pat. No. 5,556,721) discloses a lithium-containing silicon shown by Li$_x$Si (0≦x≦5), as a material for activating a negative electrode. However, where the silicon is used as it is, a great amount of conductive materials is required to impart conductivity. No satisfactory performance can be realized at a high current density. JP-A-7-315822 (corresponding to EP-A-685896) discloses a rechargeable battery comprising a carbonaceous negative electrode material containing a small amount of silicon. However, when such a negative material is used, battery properties are limited by the carbonaceous material, a battery having high capacity and high density cannot be obtained.

According to the present invention, it is discovered that silicon or a compound thereof is heated at 600 to 1,500° C. under a non-oxidative atmosphere in the coexsistence with an organic material or a carbon material to obtain a battery being capable of charging and discharging and having relatively higher capacity compared to that using only a carbon material.

DETAILED DESCRIPTION OF THE INVENTION

Next, the present invention will be described in detail.

In the present invention, the simple substance of silicon may be either crystalline or amorphous. An example of the silicon compound includes an inorganic silicon compound such as a silicon oxide and an organic silicon compound such as a silicone resin and a silicon-containing polymer, which can be changed to silicon by calcination. Among them, the simple substance of silicon is particularly preferred.

In the present invention, an organic material is any material which can be carbonized by a heat treatment, but has no more limitation. Typical examples of the organic material include thermosetting resins such as a phenol resin, an epoxy resin, an unsaturated polyester resin, a furan resin, a urea resin, a melamine resin, an alkyd resin and a xylene resin, blends thereof and modified resins thereof; and then condensed polycyclic hydrocarbon compounds such as naphthalene, acenaphthylene, phenanthrene, anthracene, triphenylene, pyrene, chrysene, naphtacene, picene, perylene, pentaphene, and pentacene, derivatives thereof, and pitches including a mixture thereof as the main component.

Alternatively, a carbon material can be used instead of or together with the above shown organic materials. Examples of the carbon material includes a carbonized substance obtained by heating the above shown organic materials, cokes, glass-like carbon, graphite and the like. The carbon material generally contains 70% by weight or more of carbon and mainly includes crystalline or amorphous carbon.

A content of silicon is preferably 30 to 90% by weight, more preferably 50 to 90% by weight, of the negative electrode material. If the silicon content is small, carbon becomes the main component which occupies the negative electrode material to a large extent, thereby reducing the capacity thereof. On the other hand, if the silicon content is too much, the capacity is also reduced similarly to the case of using the simple substance of silicon.

A content of carbon is preferably 10 to 70% by weight, more preferably 10 to 50% by weight, of the negative electrode material. If the carbon content exceeds 70% by weight, carbon becomes the main component, thereby reducing the capacity as described above. On the other hand, if the carbon content is less than 10% by weight, it reacts with lithium similarly to the case of using the simple substance of silicon, thereby also reducing the capacity.

The silicon or a compound thereof is heated under a non-oxidative atmosphere in the coexsistence with an organic material or a carbon material, thereby being capable of charging and discharging, thus affording the high capacity. The reason for this is assumed that a surface state of the organic material has not changed, but the surface state of the silicon compound has changed.

The temperature of heating the silicon or a compound thereof under a non-oxidative atmosphere, for example, nitrogen or argon, preferably nitrogen, in the coexsistence with the organic material or the carbon material is in the range of 600 to 1,500° C., desirably of 800 to 1,200° C. In heating at lower than 600° C., carbonization is insufficiently conducted. In heating at higher than 1500° C., silicon carbide (SiC) which is not involved in charging and discharging is produced. In either cases, it results in lowering the capacity. The heating period in time is from 0.1 to 10 hours, preferably 1 to 6 hours.

When the silicon or a compound thereof is heated under a non-oxidative atmosphere in the coexsistence with the organic material or the carbon material, the silicon or a compound thereof may be in the form of powder or slurry.

The silicon/carbon composite material for the negative electrode material of the present invention can be applied to a copper foil or a copper mesh, then dried to form a coating film, thereby being used as the negative electrode for battery. In applying, a known binder which is dissolved in a suitable solvent such as n-methyl-2-pyrrolidone can be used. As the binder, any conventionally known material which is inactive in the battery such as polytetrafluoroethylene, polyvinylidenedifluoride, polyethylene and polypropylene can be used.

More preferably, the silicon/carbon composite material is heated after applying and drying, then the silicon/carbon composite material will hardly remove from the copper foil or the like. The heating is conducted under a non-oxidative atmosphere at 600 to 1,000° C. for 10 minutes to 10 hours, preferably 1 to 6 hours.

As the positive electrode material used in the present invention, any conventional material can be used. Examples thereof include $Li_xCoO_2$, $Li_xNiO_2$, $MnO_2$, $Li_xMnO_2$, $Li_xMn_2O_4$, $Li_xCo_yMn_{2-y}O_4$, $\alpha-V_2O_5$, $TiS_2$ and the like. Among them, complex oxides of lithium are particularly preferred.

According to the present invention, a non-aqueous electrolyte is prepared by properly combining an organic solvent with an electrolyte. Any organic solvent or electrolyte can be used as long as it is generally used for this type of battery.

Examples of the organic solvent includes propylene carbonate, ethylene carbonate, vinylene carbonater dimethyl carbonate, diethyl carbonate, methyl ethyl carbonate, 1,2-dimethoxy ethane, 1,2-diethoxy ethane methyl formate, buthyrolactone, tetrahydrofuran, 2-methyl tetrahydrofuran, 1,3-dioxolane, 4-methyl-1,3-dioxolane, diethyl ether, sulforane, methyl sulforane, acetonitrile, propionitrile, buthyronitorile, valeronitrile, benzonitrile, 1,2-dichloroethane, 4-methyl-2-pentanone, 1,4-dioxane, anisole, digleym [$(CH_3OCH_2CH_2)_2O$], dimethyl formamide, dimethyl sulfoxide and the like. These solvents may be used singly or two or more may be used. It is preferred that the above-described chain carbonic esters are used in combination with the above-described cyclic carbonic esters to a single use of each one. A mixing ratio of the former is in the range of 1 vol % to 99 vol %, more preferably 20 vol % to 80 vol %.

Examples of the electrolyte includes $LiClO_4$, $LiAsF_6$, $LiPF_6$, $LiBF_4$, $LiB(C_6H_5)_4$, $LiCl$, $LiBr$, $LiI$, $CH_3SO_3Li$, $CF_3SO_3Li$, $LiAlCl_4$ and the like. These can be used singly or two or more of them can be used. A particularly preferred electrolyte is $LiPF_6$.

EXAMPLES

The invention will be further explained by the following examples which are intended to be non-limiting. In these examples, "part(s)" and "%" mean "part(s) by weight" and "% by weight", unless otherwise indicated.

Example 1

135 parts of 30% formaldehyde solution and 7.5 parts of 25% aqueous ammonia were mixed with 150 parts of cresol (containing 38% of m-cresol) and heated at 85° C. for 105 minutes. Water was removed by reduced distillation to obtain a phenol resin. 10 parts of the resultant phenol resin was fully mixed with 10 parts of a silicon powder and was cured at 80° C. for 3 days. The resultant cured phenol resin containing silicon was calcined at 1,000° C. for 3 hours and dry milled to obtain a powder having an average powder diameter of approximately 10 μm. The powder contained about 67% of silicon. To observe properties of the powder material as an negative electrode, a battery was produced as follows and its charge and discharge property was measured.

To 90 g of the powder material, 10 g of polyvinylidene difluoride was added as a binder and was pasted with n-methyl-2-pyrrolidone. A part of the paste was applied to a stainless steel, and was pressed at a pressure of 1 t/cm². After drying, it was cut with a die in a predetermined size to produce a negative electrode.

A counter electrode was formed in the form of a disk by introducing a part of a mixture comprising 88 parts of lithium cobaltate, 6 parts of acetylene black and 6 parts of a polytetrafluoroethylene into a mold and pressing it at a pressure of 1 t/cm². Thus, a coin battery was produced.

An electrolyte was prepared by adding 1 mol/l of $LiPF_6$ to a mixed solvent of ethylene carbonate/dimethyl carbonate (volume ratio 1:1). A given amount thereof was tested. The measurement was performed at a voltage range of 2.7 V to 4.2 V and a current density of 0.5 mA/cm². A result is shown in Table 1.

Example 2

A coin battery was produced as Example 1 except that 10 parts of a silicon powder was mixed with 5 parts of a phenol resin and evaluated for charge and discharge property thereof. A result is shown in Table 1.

Example 3

A powdered sample was obtained as Example 1, except that a phenol•furfuryl alcohol•formaldehyde resin (phenol/furfuryl alcohol/formaldehyde (weight ratio)=220/246/114) was used instead of the phenol resin. A coin battery was obtained and evaluated for charge property. A result is shown in Table 1.

Example 4

A commercially available (manufactured by High purity chemicals) crystalline silicon powder having an average diameter of 1 μm and a purity of 99.9% and a mixture of graphite and a pitch resin (graphite/pitch resin ratio=9/1; Graphitone tradename, manufactured by Osaka Kasei) were mixed and stirred in toluene. They were then calcined at 600° C. for 3 hours under nitrogen atmosphere to remove volatile components. A solid material was roughly milled, and then calcined again at 1,100° C. for 3 hours under nitrogen atmosphere. Through dry milling, a silicon/carbon composite powder was obtained. The powder was slurried with polyvinylidenedifluoride as a binder dissolved in n-methyl-2-pyrrolidone, applied to a copper foil, dried at 80° C. and pressed with a flat plate pressing machine. The coating film was heated at 800° C. for 3 hours under nitrogen atmosphere, cut with a die in a diameter size of 20 mm to produce a negative electrode. A positive electrode was produced as Example 1. As electrolyte, 1 mol/l of lithium hexafluoro phosphate $LiPF_6$, dissolved in a mixed solvent of ethylene carbonate and dimethyl carbonate (volume ratio 1:1), was used. A coin-type battery thus produced was allowed and to be stand aged a whole day and night at room temperature, and tested for a charge and discharge property described later. The battery was charged at a constant current of 1.0 mA/cm² to a constant capacity (charge capacity of 55 mAh). The discharge capacity and a cycle property thereof were determined. Crystallinity was completely lost from the composite particles of the battery within the first cycle and they were changed to an amorphous structure capable of doping and undoping lithium ions reversibly. After the first cycle discharging, the amorphous structure was retained to obtain the battery for doping and undoping the lithium ions reversibly.

Example 5

A negative electrode and a coin battery were produced as Example 4 except that a pitch resin [HSB-S pitch (trade name; manufactured by Osaka Kasei)] was replaced for the mixture of graphite and the pitch resin and evaluated for charge and discharge property thereof.

Example 6

A positive electrode was prepared by mixing 50 g of a $LiNiO_2$ powder manufactured by Tanaka Chemicals Co., Ltd. with 10 g of acetylene black and 6.7 g of polyvinylidenedifluoride as a binder, pasting them with using n-methyl-2-pyrrolidone, applying a part of the paste to an Al foil and cutting it with a die in a diameter size of 20 mm. A negative electrode was produced according to Example 4. A predetermined amount of electrolyte, which had been prepared by adding 1 mol/l of $LiPF_6$ to a mixed solvent of ethylene carbonate/dimethyl carbonate (volume ratio 1:1), was added for evaluation. The measurement was performed at a constant capacity charging (750 mAh/g) and a current density of 0.5 mA/cm².

Comparative Example 1

A coin battery was produced as Example 1 except that the silicon powder was used as it was without mixing with the phenol resin and evaluated for charge and discharge property thereof. A result is shown in Table 1.

As apparent from the result, an insufficient discharge capacity was obtained by using the simple substance of silicon.

Comparative Example 2

A coin battery was produced as Example 1, except that the heating temperature was 1,800° C., and evaluated for charge and discharge property thereof. A result is shown in Table 1.

TABLE 1

| | Si Content (%) | Heating Temp. (° C.) | Negative Electrode Discharge Capacity (mAh/g) | Battery Capacity (mAh) |
|---|---|---|---|---|
| Example 1 | 67 | 1000 | 560 | 40 |
| Example 2 | 80 | 1000 | 480 | 35 |
| Example 3 | 67 | 1000 | 650 | 48 |
| Example 4 | 80 | 1100 | 750 | 55 |
| Example 5 | 80 | 1100 | 750 | 55 |
| Example 6 | 80 | 1100 | 750 | 60 |
| Comparative Example 1 | 100 | 1000 | 150 | 10 |
| Comparative Example 2 | 67 | 1800 | 10 | 2 |

What is claimed is:

1. A method for preparing a negative electrode material for a non-aqueous secondary battery, having a silicon content in the range of 30 to 90% by weight and a carbon content in the range of 10 to 70% by weight, which comprises the step of heating silicon or a compound thereof at 600 to 1,500° C. under a non-oxidative atmosphere in the coexsistence with an organic material or a carbon material.

2. The method claimed in claim 1, wherein the silicon compound is selected from the group consisting of a silicon oxide, a silicone resin and a silicon-containing polymer.

3. The method claimed in claim 1, wherein the organic material is a material which can be carbonized by a heat treatment.

4. The method according to claim 1, wherein the organic material is at least one selected from the group consisting of phenol resin, epoxy resin, unsaturated polyester resin, furan resin, urea resin, melamine resin, alkyd resin, xylene resin, pitch resin, naphthalene, acenaphthylene, phenanthrene, anthracene, triphenylene, pyrene, chrysene, naphtacene, picene, perylene, pentaphene, and pentacene.

5. The method according to claim 1, wherein the carbon material is selected from the group consisting of coke, glass-like carbon and graphite.

6. The method according to claim 1, wherein the non-oxidative atmosphere is argon or nitrogen.

7. The method according to claim 1, further comprising:
applying the negative electrode material to a copper foil or a copper mesh; and
drying to form a coating film.

8. The method according to claim 7, wherein in applying, a binder is dissolved in a solvent.

9. The method according to claim 8, wherein the binder is selected from the group consisting of polytetrafluoroethylene, polyvinylidenedifluoride, polyethylene and polypropylene.

10. The method according to claim 8, wherein the solvent is n-methyl-2-pyrrolidone.

* * * * *